3,194,720
MELAMINE LAMINATING RESIN MODIFIED
WITH AN ANHYDRIDE OF SORBITOL
Gabriel M. Grudus, Springfield, and James D. Larkin,
West Springfield, Mass., assignors to Monsanto Company, a corporation of Delaware
No Drawing. Filed May 7, 1963, Ser. No. 278,763
20 Claims. (Cl. 161—156)

The present invention relates to novel thermosetting resins and to laminated structures prepared from the novel thermosetting resins.

Aminoplast type resins generally of the melamine-formaldehyde type are widely employed in the preparation of laminated structures. While such resins have achieved great commercial success, the melamine-formaldehyde resins are subject to three well-recognized shortcomings. First, the laminating resins have poor stability in aqueous solutions in that the resin separates therefrom upon standing for relatively short periods of time, e.g., 1–2 days. The resin which separates from the solution cannot be redispersed and must be discarded. As a result of this fact, the manufacturers of melamine-formaldehyde laminating resins must separate these resins from the aqueous solutions in which they are prepared by spray-drying or analogous drying processes. This drying step adds substantially to the cost of the resins. Second, when melamine-formaldehyde resins are employed to impregnate the top or overlay sheet of decorative laminates, it is necessary to employ a special viscose rayon paper to obtain maximum transparency. Such viscose rayon papers are considerably more expensive than the high alpha-cellulose paper employed in the print sheet of the decorative laminate. Third, laminates that are prepared from commercial melamine-formaldehyde laminating resins have poor postforming properties. It would be desirable to have available to the art melamine-formaldehyde type laminating resins which do not suffer from the above noted shortcomings.

It is an object of this invention to provide novel modified aminotriazine-aldehyde resins.

Another object of this invention is to provide aqueous solutions of modified aminotriazine-aldehyde resins which are stable over extended periods of time.

A further object of this invention is to provide decorative laminates in which the top or overlay sheet is a high alpha-cellulose paper impregnated with a modified aminotriazine-aldehyde resin.

Yet another object of this invention is to provide a modified aminotriazine-aldehyde resin impregnated laminate having good postforming properties.

Still other objects and advantages of this invention will be apparent from the following detailed description thereof.

The present invention provides novel resins which are the co-condensation products of an aminotriazine, an aldehyde and an anhydride of sorbitol which components are present in certain critical proportions.

The following examples are set forth to illustrate more clearly the principle and practice of this invention to those skilled in the art. Unless otherwise noted, where quantities are mentioned they are parts by weight.

EXAMPLE I

Part A

Two hundred parts (2.5 mols) of 37% formalin solution are neutralized to a pH of 8.9 with sodium hydroxide and there is then added to the solution 126 parts (1 mol) of melamine and 50 parts of the 1,4 anhydride of sorbitol. The reaction mixture is heated to 90° C. and held at this temperature for about 3 hours until the resin has a water-dilutability point of about 30%. The pH of the mixture is maintained at 8.5–9.0 throughout the reaction by addition of caustic soda as required. The water-dilutability point is defined as the concentration of resin solids to which a resin solution can be diluted with water at 25° C. before incipient precipitation of the resin occurs. The resin solution is then cooled to 25° C. and adjusted to 60% resin solids with water.

The 60% resin solution can be stored up to about 8 weeks at 25° C. without precipitation of the resin.

Part B

To illustrate the outstanding solution stability of the resin prepared in Part A above, a control resin solution is prepared by dissolving 60 parts of a commercially available melamine-formaldehyde laminating resin (formaldehyde/melamine ratio=2.5/1) in 40 parts of water. The control resin solution is maintained at 25° C. and at the end of two days, the resin solution gelled.

EXAMPLE II

A resin is prepared in exactly the same manner as described in Example I, Part A, except that in place of the melamine, a mixture is employed consisting of 90 parts of melamine and 10 parts of tetrahydrobenzoguanamine.

EXAMPLE III

A resin is prepared in exactly the same manner as described in Example I, Part A, except that in place of the melamine, a mixture is employed consisting of 10 parts of melamine and 90 parts of tetrahydrobenzoguanamine.

EXAMPLE IV

A resin is prepared from a mixture of 126 parts (1 mol) of melamine, 200 parts (2.5 mols) of 37% formalin solution, 50 parts of the 1,4 anhydride of sorbitol and 1.0 part of thiourea following the procedure of Example I, Part A. The stability of an aqueous solution of the resin is comparable to the stability of the resin prepared in Example I, Part A.

EXAMPLE V

Three decorative laminates designated as A, B, and C are prepared from 7 substrate sheets of kraft paper impregnated with about 35 weight percent of a commercially available phenol-formaldehyde resin and suitable alpha-cellulose print sheet and alpha-cellulose overlay sheet. Throughout this appication, the stated percentages of resin, in a resin impregnated sheet, are based upon the weight of the final impregnated sheets. In addition to each of the resin solutions employed for preparing the laminates of this example, 0.5 weight percent of the hydrochloric acid salt of 2-amino-2-methyl propanol-1 based on the weight of the resin solids is added thereto. The catalyst aids in the curing of the laminate when subjected to heat and pressure. The laminates are prepared by pressing the assemblies for 20 minutes at 290° F. at a pressure of 1000 lbs. per square inch.

In each of the laminates prepared as described below, the print sheet is impregnated with about 40 weight percent with the resin employed and the overlay sheet with about 65 weight percent of the resin employed therein. In laminate A both the print sheet and the overlay sheet are impregnated with the resin of this invention which is described in Example I, Part A. In laminate B the overlay sheet is impregnated with the resin of this invention described in Example I, Part A, and the print sheet is impregnated with a commercially available melamine-formaldehyde resin having a formaldehyde/melamine mol ratio of 2.5/1. In laminate C both the overlay sheet and the print sheet are impregnated with a commercially available melamine-formaldehyde laminating resin having a formaldehyde/melamine mol ratio of 2.5/1.

The overlay sheets of decorative laminates A and B are substantially more transparent than the overlay sheet of laminate C which results in the print sheets of laminates A and B appearing substantially clearer, brighter and better defined than the print sheet of laminate C.

Comparable results are obtained when the overlay sheets in laminates A and B are impregnated with the resin of Examples II, III or IV. In addition, it is observed that the laminates which the overlay sheet is impregnated with the resin of Example IV have improved gloss as well.

EXAMPLE VI

A decorative laminate panel is prepared from 7 substrate sheets of kraft paper impregnated with about 35 weight percent of a commercially available phenol-formaldehyde resin and an alpha-cellulose print sheet carrying a dark wood-grained pattern and impregnated with about 40 weight percent of a melamine-formaldehyde resin having a formaldehyde/melamine mol ratio of 2.5/1. One-half of the panel is overlaid with a 4-mil alpha-cellulose sheet impregnated with about 65 weight percent of the resin of this invention described in Example I, Part A. The other half of the panel is overlaid with a 4-mil sheet of viscose rayon paper impregnated with about 65 weight percent of the melamine-formaldehyde resin employed to impregnate the print sheet. With each of the resin solutions employed in this example for preparing the laminates, 0.5 weight percent of the hydrochloric acid salt of 2-amino-2-methyl propanol-1 based on the weight of the resin solids is added thereto. The laminate is pressed for 20 minutes at 290° F. at a pressure of 1000 lbs. per square inch.

The section of the panel overlaid with the alpha-cellulose paper impregnated with the resin of this invention is as transparent as the section of the panel overlaid with the viscose rayon paper impregnated with the prior art melamine-formaldehyde resin. As a result, the section of the panel overlaid with the alpha-cellulose paper is as clear, as bright and as aesthetically pleasing as the section of the panel overlaid with the more expensive viscose rayon paper.

Similar results are obtained when the alpha-cellulose overlay sheet is impregnated with a resin of Examples II, III or IV.

EXAMPLE VII

Part A

A postformable laminate is prepared from a postformable core, a print sheet, and an overlay sheet. The core consists of a bottom sheet of kraft paper, 3 intermediate sheets of crepe paper and a top sheet of kraft paper, all of said sheets being impregnated with about 35 weight percent of a commercially available postformable, phenol-formaldehyde resin. The print sheet is a 12-mil sheet of alpha-cellulose paper impregnated with 40 weight percent of the resin described in Example I, Part A. The overlay sheet is a 4-mil sheet of alpha-cellulose paper impregnated with 65 weight percent of the resin described in Example I, Part A. As in Example VI, the same catalyst is employed with each of the resin solutions used in preparing the laminates and in the same amount. The laminate is prepared by pressing the assembly for 20 minutes at 275° F. at a pressure of 1000 lbs. per square inch. The finished laminate is about 0.050 inch thick.

Part B

A postformable laminate identical to that described in Part A above is prepared except that the print sheet and the overlay sheet are impregnated with the resin of Example II.

Part C

A laminate identical to that described in Part A above is prepared except that the print sheet and the overlay sheet are impregnated with the resin of Example III.

Part D

A control postformable laminate is prepared in exactly the same manner as described in Part A above except that the resin employed to impregnate the print sheet and the overlay sheet is a commercially available melamine-formaldehyde laminating resin having a formaldehyde/melamine mol ratio of 2.5/1.

Part E

The postformability of the laminates prepared in Parts A, B, C and D above is determined by NEMA method LP2-2.11. In this test method, the laminates are heated and bent through an angle of 90° in a series of jigs providing varying radii of curvature at the bend. The smaller the radius of curvature through which the laminate can be bent without surface cracking the better is the postformability of the laminate. The laminates prepared in Parts A, B and C above with a resin of this invention can be bent through a ⅜ inch radius of curvature without cracking. By way of contrast, the laminate prepared in Part D above with a prior art melamine-formaldehyde laminating resin cracks when bent through a radius of curvature of 1 inch.

As shown by the examples set forth herein, the surprising discovery of the instant invention is that the resin compositions employing the anhydride of sorbitol are extremely stable and can be stored in aqueous solutions at 25° C. for periods of up to about 8 weeks without the resin precipitating therefrom. This is a substantial increase over the 1 or 2 days of stability obtained with a conventional resin of the melamine-formaldehyde type. In addition, the other surprising and important discovery is that when the resin composition of this invention is employed to impregnate a high alpha-cellulose paper that is subsequently used as the overlay sheet in the manufacture of a decorative laminate, the resins of this invention provide superior transparency to that obtained with commercially available melamine-formaldehyde resins. Further, in addition, another surprising discovery is that a decorative laminate prepared with resins of the instant invention has excellent postforming properties in comparison to decorative laminates employing only a melamine-formaldehyde resin.

The resinous thermosetting co-condensation products of this invention are characterized by the ratio of the reactants contained therein and comprise an aminotriazine, an aldehyde and an anhydride of sorbitol wherein the aldehyde is present in the ratio of 1.5–6.0 mols per mol of aminotriazine and the anhydride of sorbitol is present in an amount of 5–40 weight percent of the total resin. The anhydride of sorbitol employed in the practice of this invention may be either the 1,4 or the 2,5 or the 3,6 anhydride of sorbitol or mixtures thereof. The amount of the anhydride of sorbitol employed in the resin composition of this invention can be 5–40 weight percent and is preferably 15–25 weight percent of the resin composition. The preferred anhydride of sorbitol to be employed in the practice of this invention is the 1,4 anhydride of sorbitol.

Unless the limits of the anhydride of sorbitol as discussed in the paragraph above are carefully observed, the resins either will be deficient in certain important properties or will be relatively unstable in aqueous solution or both. If the resins contain less than 5 weight percent of the anhydride of sorbitol, little or no improvement in resin properties is attained and resin solution stability is seriously hindered. On the other hand, if the resins contain more than about 40 weight percent thereof, the boiling water resistance of laminates prepared from such resins tends to be deficient. Optimum solution stability is attained when the resins contain about 10-20 weight percent of the anhydride of sorbitol, and optimum postformability is attained when the resins contain 20 or more weight percent thereof. An optimum balance of properties of transparency, solution stability and postformability is attained when the resins contain about 15-25 weight percent of the anhydride of sorbitol.

In the practice of this invention, the aminotriazine compounds which are suitable for use herein are melamine, substituted melamines, or cycloaliphatic guanamines or mixtures of the above. The substituted melamines which can be employed herein are the alkyl melamines and aryl melamines which can be mono-, di-, tri- or tetra substituted. In the alkyl substituted melamines, each alkyl group can contain 1-6 carbon atoms and, preferably, 1-4 carbon atoms. Typical examples of some of the alkyl substituted melamines are monomethyl melamine, dimethyl melamine, trimethyl melamine, monoethyl melamine and 1-methyl-3-propyl-5-butyl melamine. In the aryl substituted melamines, each aryl group can contain 1-2 phenyl radicals and, preferably, 1 phenyl radical. A typical example of an aryl substituted melamine is monophenyl melamine or diphenyl melamine.

The cycloaliphatic guanamines which can be employed in the practice of this invention can be any of the cycloaliphatic guanamines. Preferably, the cycloaliphatic guanamines should not have more than 15 carbon atoms. Typical examples of some of the cycloaliphatic guanamines are tetrahydrobenzoguanamine, hexahydrobenzoguanamine, 3 - methyl - tetrahydrobenzoguanamine, 3-methylhexahydrobenzoguanamine, 3,4-dimethyl-1,2,5,6-tetrahydrobenzoguanamine and 3,4-dimethylhexahydrobenzoguanamine and mixtures thereof. A preferred cycloaliphatic guanamine is tetrahydrobenzoguanamine.

It is sometimes desirable to employ a mixture of aminotriazine compounds such as melamine and an alkyl substituted melamine such as dimethyl melamine. Another mixture of aminotriazine compounds which has proved very successful as shown in the examples is a mixture of melamine and a cycloaliphatic guanamine such as tetrahydrobenzoguanamine. This mixture of aminotriazine compounds produced excellent results as shown in the examples. When employing a mixture of aminotriazine compounds as for example, melamine and tetrahydrobenzoguanamine, the mixture should consist of 95-5 weight percent of melamine and, correspondingly, 5-95 weight percent of tetrahydrobenzoguanamine. The same limits of the mixture would apply when using any mixture of the aminotriazine compounds. A preferred mixture is 75-95 weight percent of melamine and, correspondingly, 25-5 weight percent of tetrahydrobenzoguanamine.

The aldehyde employed in the practice of this invention can be any of the aliphatic aldehydes which condense with the aminotriazine and the anhydride of sorbitol. Particularly useful are acetaldehyde, butyraldehyde, formaldehyde, crotonic aldehyde, acrolein, heterocyclic aldehydes such as benzaldehyde, furfural and halogen substituted aldehydes such as alpha-chlorobutyraldehyde, alpha-fluorobutyraldehyde and the like. The mol ratio of aldehyde to aminotriazine should be 1.5-6.0 and, preferably, 2.0-4.0 mols per mol of aminotriazine. The preferred aldehyde to be employed in the practice of this invention is formaldehyde.

If desired, thiourea may be included in the resins of the invention in amounts of up to about 2.5 parts per 97.5 parts of aminotriazine. The presence of this quantity of thiourea accelerates the cure rate of the resin and also increases the gloss of laminates prepared therefrom. In addition, the presence of thiourea in the resin permits decorative laminates having an overlay sheet impregnated therewith to be removed from the press hot with little or no loss of gloss. In another embodiment of the invention, comparable results are obtained by adding mixing thiourea with a solution of a resin of this invention in amounts of up to about 2.5 parts per 97.5 parts of the melamine contained in the resin.

When preparing resin compositions of this invention, the water dilutability point of the resins can be critical with respect to the stability of solutions of the resins in water. For reasons which are not clearly understood, if the water-dilutability point is below 15% or above 35%, the resins precipitate from aqueous solutions in relatively short periods of time, e.g., 2-3 days and may even gel in the same short period of time.

When the resins of the invention are to be employed as laminating syrups, 40-60 weight percent of the resin should be dissolved in a corresponding 60-40 weight percent of a solvent consisting of either water or a mixture of a major amount of water and a minor amount of an acyclic alcohol containing 1-4 carbon atoms, e.g., methanol, ethanol, ethplene glycol, glycerine, propylene glycol, etc. The precise quantity of acyclic alcohol requied in the water-alcohol solvent media will depend upon the specific structure of the resin, but generally will be within the range of 0.5-40 weight percent and as a practical matter 0.5-20 weight percent and, preferably, less than 5 weight percent of the solvent media. Laminating syrups of the above type may be stored for periods of 6-8 weeks at temperatures in the range of 20-30° C. with little or no precipitation of the resin from the solution.

The reaction between the aminotriazine, the anhydride of sorbitol and the aldehyde should be carried out at a pH of 7-11 and, preferably, at a pH of 8-10. The pH of the reaction mixture is conveniently adjusted with an aqueous solution of an alkali such as sodium hydroxide, potassium hydroxide, triethanolamine, etc. The temperature of the reaction may be varied from about 60° C. to reflux temperature at atmospheric pressure. For purposes of accurate control of reaction rate, and in order to control the properties of the reaction product, it is preferable to conduct the reaction at a temperature of about 80-100° C. for the greater part of the reaction time. In one embodiment of the invention, the anhydride of sorbitol and the aldehyde can be condensed in a neutral or slightly acidic (pH=5.0-6.5) aqueous medium. The pH is then adjusted to the alkaline side and anhydride of sorbitol-aldehyde condensate is then reacted with the proper quantity of the aminotriazine to the desired water-dilutability point.

Although this invention is primarily directed to a resin composition product wherein the anhydride of sorbitol is reacted with the aminotriazine and the aldehyde, equally excellent results in a laminate are obtained by adding the anhydride of sorbitol to the laminating syrup, which laminating syrup has been previously described as to the preparation thereof. This is accomplished by first preparing a laminating syrup of an aminotriazine-aldehyde resin. To this, the anhydride of sorbitol is then added in an amount to constitute 5-40 weight percent based on the weight of the resin solids employed. Again, the aminotriazine and the aldehyde can be any of those previously described and in the mol ratios set forth herein. It is preferred, however, to react the anhydride of sorbitol with the aminotriazine and the aldehyde since this will produce a more stable laminating syrup when employed as such for preparing decorative laminates. In addition, it will avoid the added step of mixing anhydride of sorbitol in the laminating syrup.

The preparation of laminates employing the resins of the invention in general follows procedures which are well-known in the art. Inert filler sheets of alpha-cellulose paper, viscose rayon paper, glass cloth or cloth prepared from cotton, wool or synthetic fibers are impregnated within 30-80 weight percent of the resin and dried to a volatile content of the order of 3-10%. An assembly of such resin-impregnated sheets is then subjected to a pressure of the order of 100-2000 lbs. per square inch and heated for 5-60 minutes at a temperature of 200-400° F.

When preparing laminates employing the resins of this invention, it may be desirable to add a catalyst to the resin in order to aid in the curing process of the treated filler sheets. Common catalysts so employed are those catalysts which liberate acid when subjected to heat and are added in an amount varying from 0.1 weight percent to 10.0 weight percent based on the weight of the resin solids and, preferably, will vary from 0.5 weight percent to 4.0 weight percent thereof. Such catalysts include the organic and inorganic acid salts of primary, secondary, and tertiary amines such as the hydrochloric acid salt of 2-amino-2-methyl propanol-1, the hydrochloric acid salt of mono-, di- and tri-ethanolamine, the hydrochloric acid salt of 2-dimethylamino-2-methyl propanol, the para-toluene sulfonic acid salt of aminomethyl propanol-1, the chloroacetic acid salt of pyridine, the triammonium acid pyrophosphate salt of aminomethyl propanol-1, the phosphoric acid salt of 2-amino-2-methyl propanol-1, the phosphoric acid salt of mono-, di-, and tri-ethanolamines, the phosphoric acid salt of 2-dimethylamino-2-methyl propanol, ethylene sulfite, etc. Other catalysts include the inorganic salts of inorganic acids such as ammonium chloride, magnesium chloride, zinc chloride, etc. In fact, the catalyst system may include mixtures of the above different types of catalysts such as a mixture of magnesium chloride and the hydrochloric acid salt of 2-amino-2-methyl propanol-1, a mixture of the hydrochloric acid salt of monoethanolamine and diethanolamine, etc. The catalyst can be added to the kettle near the end of the condensation reaction or it may be added to the laminating syrup when used to prepare laminates.

Decorative laminates are prepared from an assembly of (1) a rigid substrate, (2) a resin-impregnated print sheet, i.e., a paper sheet having a design printed thereon, and (3) a resin-impregnated top or overlay sheet. In such decorative laminates, the rigid substrate may consist of any suitable material such as plywood, a resin-bonded wood fiber board or the like, a plurality of resin-impregnated sheets, etc. The printed sheet preferably is impregnated with a resin of this invention, although in other embodiments of the invention the print sheet can be impregnated with an unmodified melamine-formaldehyde resin or a melamine-formaldehyde resin that is modified with minor amounts of other compounds such as toluene sulfonamide or an omega cyanoalkylguanamine. The overlay sheet is impregnated with a resin of this invention. Although the overlay sheet may be viscose rayon paper, an outstanding feature of the invention is that excellent transparency is obtained even when the overlay sheet is a high alpha-cellulose paper. This is a matter of considerable importance, since the viscose rayon papers presently employed in the overlay sheet are considerably more expensive than the high alpha-cellulose papers which are employed as the print sheet. High alpha-cellulose papers are defined as those in which the fibrous web consists of at least 90 weight percent of alpha-cellulose.

Where decorative laminates having postforming properties are desired, the rigid substrate must be of a postformable material such as a plurality of paper sheets (preferably creped) impregnated with specially formulated postformable varnishes such as phenolformaldehyde resins, cresol-phenol-formaldehyde resins, etc. The print sheet must be impregnated with either the resins of the present invention or another postformable aminoplast resin such as a melamine-toluene sulfonamideformaldehyde resin or a melamine-omega cyanoalkylguanamineformaldehyde resin or mixtures of other known postformable aminoplast resins. The overlay sheet is impregnated with a resin composition of this invention.

The resinous condensation product of this invention can also be used in such other applications as the bonding of fibers to form fibrous structures which are used as oil filters, water filters, air filters, thermal insulation, molded furniture parts, etc., as orthopedic resins, as the bonding of wood veneer to form laminate plywood structures and for high density molded objects which may or may not employ powdered mica, asbestos, cellulosic fibers such as bleached alpha-cellulose flock, unbleached alpha-cellulose flock and may include pigments.

It will thus be seen that the objects set forth above, among those made apparent from the description, are efficiently attained, and since changes may be made in carrying out the above process and in the composition set forth without departing from the scope of this invention, it is intended that all matters contained in the above description shall be interpreted as illustrative and not in a limiting sense.

What is claimed is:

1. A resinous thermosetting co-condensation product comprising an aminotriazine, an aldehyde and an anhydride of sorbitol wherein said aldehyde is present in the ratio of 1.5–6.0 mols per mol of aminotriazine and said anhydride of sorbitol constitutes 5–40 weight percent of the total reactants; said aminotriazine being selected from the group consisting of melamine, substituted melamines and cycloaliphatic guanamine, and mixtures thereof.

2. The resinous thermosetting co-condensation product of claim 1 wherein the anhydride of sorbitol is the 1,4 anhydride of sorbitol.

3. The resinous thermosetting co-condensation product of claim 1 wherein the aminotriazine is a mixture of 95–5 weight percent of melamine and, correspondingly, 5–95 weight percent of cycloaliphatic guanamine.

4. The resinous thermosetting co-condensation product of claim 3 wherein the cycloaliphatic guanamine is tetrahydrobenzoguanamine.

5. The resinous thermosetting co-condensation product of claim 3 wherein the aldehyde is formaldehyde.

6. The resinous thermosetting co-condensation product of claim 1 wherein the aminotriazine is an alkyl substituted melamine containing up to 4 alkyl groups with each alkyl group containing 1–6 carbon atoms.

7. The resinous thermosetting co-condensation product of claim 2 wherein the aminotriazine is melamine and the aldehyde is formaldehyde.

8. A laminating syrup that is stable for an extended period of time and comprising 40–60 weight percent of the resinous thermosetting co-condensation product of claim 1 in solution in 60–40 weight percent of a solvent taken from the group consisting of water and mixtures of a major amount of water and a minor amount of an acyclic alcohol containing 1–4 carbon atoms.

9. The laminating syrup of claim 8 wherein the resinous thermosetting co-condensation product is that of claim 2.

10. The laminating syrup of claim 8 wherein the resinous thermosetting co-condensation product is that of claim 3.

11. The laminating syrup of claim 8 having in solution therewith a catalyst which will liberate acid upon heating.

12. A normally rigid postformable laminate comprising a sheeted inert filler bonded with the thermoset resin of claim 1.

13. A normally rigid postformable laminate comprising a sheeted inert filler bonded with the thermoset resin of claim 2.

14. A normally rigid postformable laminate comprising a sheeted inert filler bonded with the thermoset resin of claim 3.

15. A decorative laminate comprising a thermoset resin-bonded assembly of a rigid substrate, a decorative print sheet impregnated with a melamine-formaldehyde resin, and an overlay sheet impregnated with a resin of claim 1.

16. A decorative laminate as in claim 12 in which the overlay sheet is a sheet of high alpha-cellulose paper impregnated with a resin of claim 1.

17. A process for preparing a laminating syrup which comprises mixing in a solvent solution a resinous thermosetting co-condensation product of an aminotriazine and an aldehyde which reactants are in the ratio of 1.5–6.0 mols of the aldehyde per mol of aminotriazine and 5–40 weight percent based on the weight of the resin solids of an anhydride of sorbitol; said solvent being taken from the group consisting of water and mixtures of a major amount of water and a minor amount of an acyclic alochol containing 1–4 carbon atoms: said aminotriazine being selected from the group consisting of melamine, substituted melamines and cycloaliphatic guanamines and mixtures thereof.

18. The process of claim 17 wherein the anhydride of sorbitol constitutes 15–25 weight percent based on the weight of the resin solids.

19. The process of claim 17 wherein the aminotriazine is melamine and the aldehyde is formaldehyde.

20. The process of claim 17 wherein the aminotriazine is a mixture of 95–5 weight percent of melamine and, correspondingly, 5–95 weight percent of tetrahydrobenzoguanamine.

References Cited by the Examiner
UNITED STATES PATENTS

| | | | |
|---|---|---|---|
| 2,773,788 | 12/56 | Magrane et al. | 161—165 |
| 2,801,198 | 7/57 | Morris et al. | 161—263 |
| 2,929,798 | 3/60 | Wayland et al. | 260—29.4 |
| 3,082,180 | 3/63 | Boldizar et al. | 260—17.3 |

FOREIGN PATENTS

| | | |
|---|---|---|
| 809,662 | 2/59 | Great Britain. |
| 919,808 | 2/63 | Great Britain. |

MURRAY TILLMAN, *Primary Examiner.*